(12) United States Patent
Park et al.

(10) Patent No.: US 11,146,728 B2
(45) Date of Patent: Oct. 12, 2021

(54) VEHICLE AND METHOD OF CONTROLLING THE SAME

(71) Applicants: Hyundai Motor Company, Seoul (KR); Kia Motors Corporation, Seoul (KR); YURA CORPORATION CO., LTD., Seongnam-si (KR)

(72) Inventors: Se Young Park, Suwon-si (KR); Jung Min Cha, Seoul (KR); Tae Ryong Kang, Suwon-si (KR)

(73) Assignees: Hyundai Motor Company, Seoul (KR); Kia Motors Corporation, Seoul (KR); Yura Corporation Co Ltd, Gyeonggi-do (KR)

( * ) Notice: Subject to any disclaimer, the term of this patent is extended or adjusted under 35 U.S.C. 154(b) by 3 days.

(21) Appl. No.: 16/776,115

(22) Filed: Jan. 29, 2020

(65) Prior Publication Data

US 2021/0120175 A1  Apr. 22, 2021

(30) Foreign Application Priority Data

Oct. 16, 2019 (KR) .......................... 10-2019-0128451

(51) Int. Cl.
*H04N 5/232* (2006.01)
(52) U.S. Cl.
CPC ..... *H04N 5/23245* (2013.01); *H04N 5/23227* (2018.08); *H04N 5/23229* (2013.01)

(58) Field of Classification Search
CPC .......... H04N 5/23245; H04N 5/23227; H04N 5/23229
USPC ....................................................... 348/148
See application file for complete search history.

(56) References Cited

U.S. PATENT DOCUMENTS

| | | | |
|---|---|---|---|
| 6,681,195 B1 * | 1/2004 | Poland ...................... | G01P 3/38 700/159 |
| 2012/0307062 A1 * | 12/2012 | Naya ..................... | G06K 9/3241 348/148 |
| 2013/0308006 A1 * | 11/2013 | Finnila ............... | H04N 5/23225 348/222.1 |
| 2018/0361972 A1 * | 12/2018 | Zagorski ............. | B60W 50/082 |
| 2019/0349516 A1 * | 11/2019 | Lee ......................... | H04N 5/265 |
| 2020/0280678 A1 * | 9/2020 | Hariyani ................. | B60R 11/04 |
| 2020/0389588 A1 * | 12/2020 | Sharma .............. | H04N 5/23222 |

* cited by examiner

*Primary Examiner* — Nguyen T Truong
(74) *Attorney, Agent, or Firm* — Morgan, Lewis & Bockius LLP

(57) ABSTRACT

A vehicle may include a camera configured to generate first image data based on tuning parameters; a first image controller including an image signal processor (ISP) configured to perform the image processing of the first image data; and a second image controller including the ISP configured to perform the image processing of the first image data. When the second image controller determines the tuning parameter based on an operation mode, the second image controller may be configured to transmit the determined tuning parameter to the camera, and the ISP of the first image controller may be configured to receive the first image data.

18 Claims, 5 Drawing Sheets

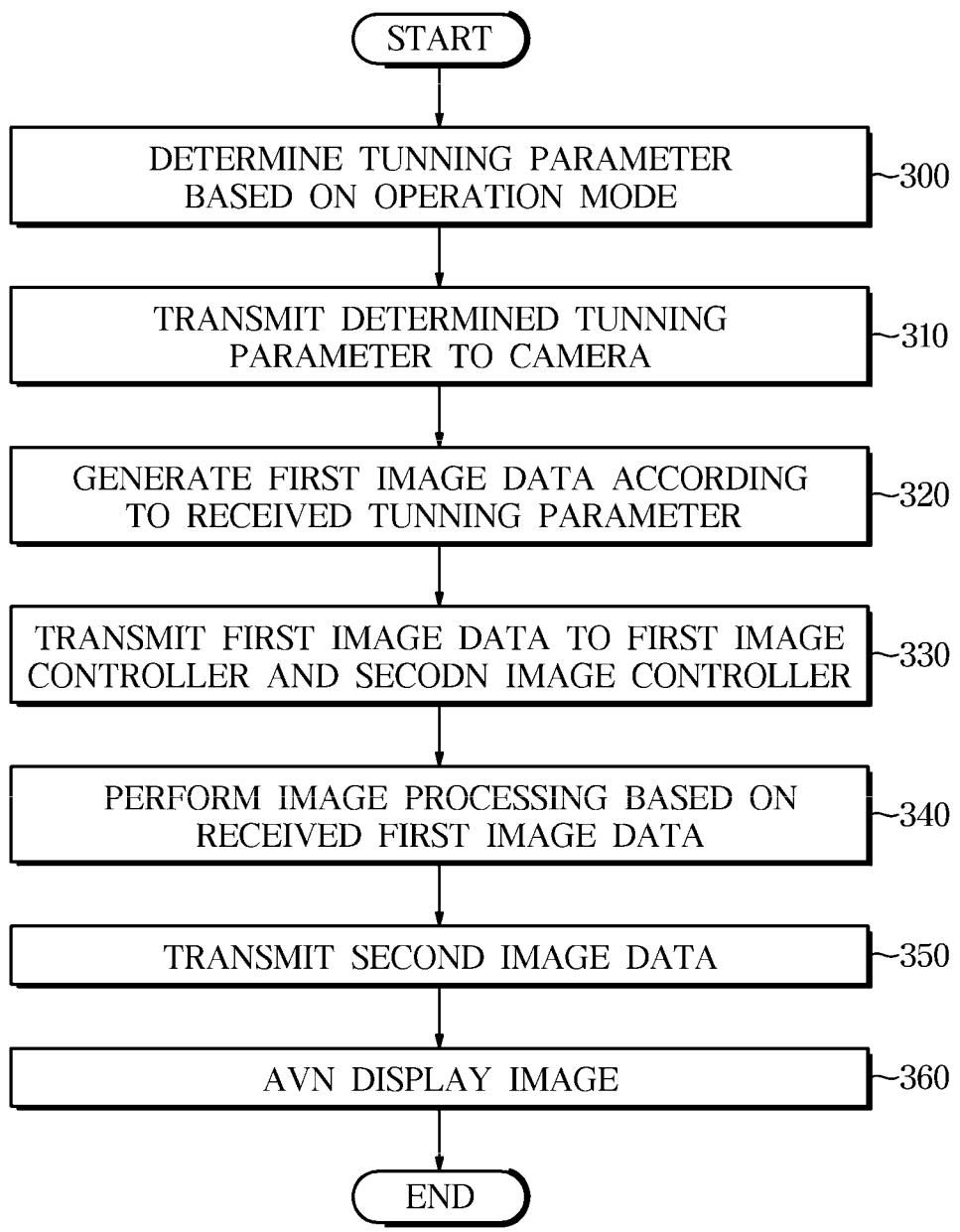

VEHICLE AND METHOD OF CONTROLLING THE SAME

CROSS-REFERENCE TO RELATED APPLICATION(S)

The present application claims priority to Korean Patent Application No. 10-2019-0128451, filed on Oct. 16, 2019 in the Korean Intellectual Property Office, the entire contents of which is incorporated herein for all purposes by this reference.

BACKGROUND OF THE INVENTION

Field of the Invention

The present invention relates to a vehicle in which an image signal processor (ISP) included in a camera is moved into a controller, and a method of controlling the vehicle.

Description of Related Art

A camera provided in a conventional vehicle includes a charge coupled device (CCD) sensor or a complementary metal-oxide semiconductor (CMOS) sensor for converting light absorbed through a lens into an electrical signal. The camera further includes an image signal processor (ISP) that performs image processing on dat an output from the CCD sensor or the CMOS sensor. The ISP performs image processing on a pixel-by-pixel basis, such as an optical system correction process of the lens and correction of defects caused by a deviation of the CCD sensor or the CMOS sensor.

The vehicle includes an image controller that additionally performs various functions such as outputting an image processed by the ISP of the camera, recording an image before output, or integrating images transmitted by a plurality of cameras.

Recently, as a plurality of controllers provided in the vehicle are integrated into one, the ISP divided into the plurality of cameras is provided inside the integrated image controller and a manner of integrated control of image processing has been studied.

However, the ISPs included in the image controllers frequently transmit different tuning parameters required for an image processing to one camera. This caused a problem of matching between the ISP and the sensor (CCD sensor or CMOS sensor) included in the camera.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle which blocks transmission of erroneous image data which may be transmitted by a camera due to signal collision and further prevents degradation of image quality and function of image controllers by providing a manner of arranging sequences between ISPs included in each of the image controllers, and a method of controlling the vehicle.

Additional aspects of the present invention will be set forth in part in the description which follows, and in part, will be obvious from the description, or may be learned by practice of the present invention.

In accordance with an aspect of the present invention, a vehicle includes a camera configured to generate first image data based on tuning parameters; a first image controller including an image signal processor (ISP) configured to perform the image processing of the first image data; and a second image controller including the ISP configured to perform the image processing of the first image data. When the second image controller is configured to determine the tuning parameter based on an operation mode, the second image controller may be configured to transmit the determined tuning parameter to the camera, and the ISP of the first image controller may be configured to receive the first image data.

The vehicle may further include an audio video navigation (AVN) configured to output an image transmitted by the first image controller. The first image controller may be configured to transmit the first image data to the AVN, and to transmit second image data obtained by image processing of the first image data by the ISP of the second image controller to the AVN.

The second image controller may be configured to transmit the determined tuning parameter to the first image controller through an inter integrated circuit (I2C) communication or a low-voltage differential signaling (LVDS) channel.

The camera may be configured to insert the determined tuning parameter into a header of the first image data.

The second image controller may be configured to, after receiving the first image data, determine an additional parameter, and to image process the first image data based on the determined additional parameter.

The second image controller may be configured to transmit the additional parameter to the first image controller through at least one of an ISP communication or a serial manner.

The first image controller may be configured to perform the image processing of the first image data according to the additional parameter.

When the first image controller is configured to determine the tuning parameter based on the operation mode, the first image controller may be configured to transmit the determined tuning parameter to the camera, and the second image controller may be configured to switch the ISP to a sleep mode.

The second image controller may be configured to generate a surround view based on a plurality of first image data transmitted from a plurality of cameras, and to transmit the generated surround view to the first image controller.

The vehicle may further include a third image controller including the ISP configured to receive the first image data and perform the image processing of the first image data. When the third image controller is configured to determine the tuning parameter based on the operation mode, the third image controller may be configured to transmit the determined tuning parameter to the camera, and the first image controller and the second image controller may be configured to receive the first image data.

In accordance with another aspect of the present invention, in a method of controlling a vehicle, the vehicle includes a first image controller including an image signal processor (ISP) and a second image controller including the ISP. The method includes determining, by the second image controller, a tuning parameter based on an operation mode; transmitting, by the second image controller, the determined tuning parameter to a camera; generating, by the camera, first image data based on the determined tuning parameter; receiving, by the first image controller and the second image controller, the first image data; and image processing, by the second image controller, the first image data.

The method may further include transmitting second image data processed by the second image controller to the first image controller; and outputting, by the first image controller, the second image data through an audio video navigation (AVN).

The method may further include transmitting, by the second image controller, the determined tuning parameter to the first image controller through an inter integrated circuit (I2C) communication or a low-voltage differential signaling (LVDS) channel.

The transmitting to the first image controller may include inserting, by the camera, the determined tuning parameter into a header of the first image data.

The method may further include, after receiving the first image data, determining, by the second image controller, an additional parameter; and image processing, by the second image controller, the first image data based on the determined additional parameter.

The method may further include transmitting, by the second image controller, the additional parameter to the first image controller through at least one of an ISP communication or a serial manner.

The method may further include performing, by the first image controller, image processing of the first image data according to the additional parameter.

The method may further include, when the first image controller is configured to determine the tuning parameter based on the operation mode, transmitting, by the first image controller, the determined tuning parameter to the camera; and switching, by the second image controller, the ISP to a sleep mode.

The method may further include generating, by the second image controller, a surround view based on the first image data transmitted from a plurality of cameras; and transmitting, by the second image controller, the generated surround view to the first image controller.

The method may further include, when the third image controller is configured to determine the tuning parameter based on the operation mode, transmitting, by the third image controller, the determined tuning parameter to the camera; image processing, by the first controller, the first image data; and receiving, by the first image controller and the second image controller, the first image data according to the determined tuning parameter.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5 is a flowchart illustrating a method of controlling a vehicle according to exemplary embodiments of the present invention.

Figure 1:
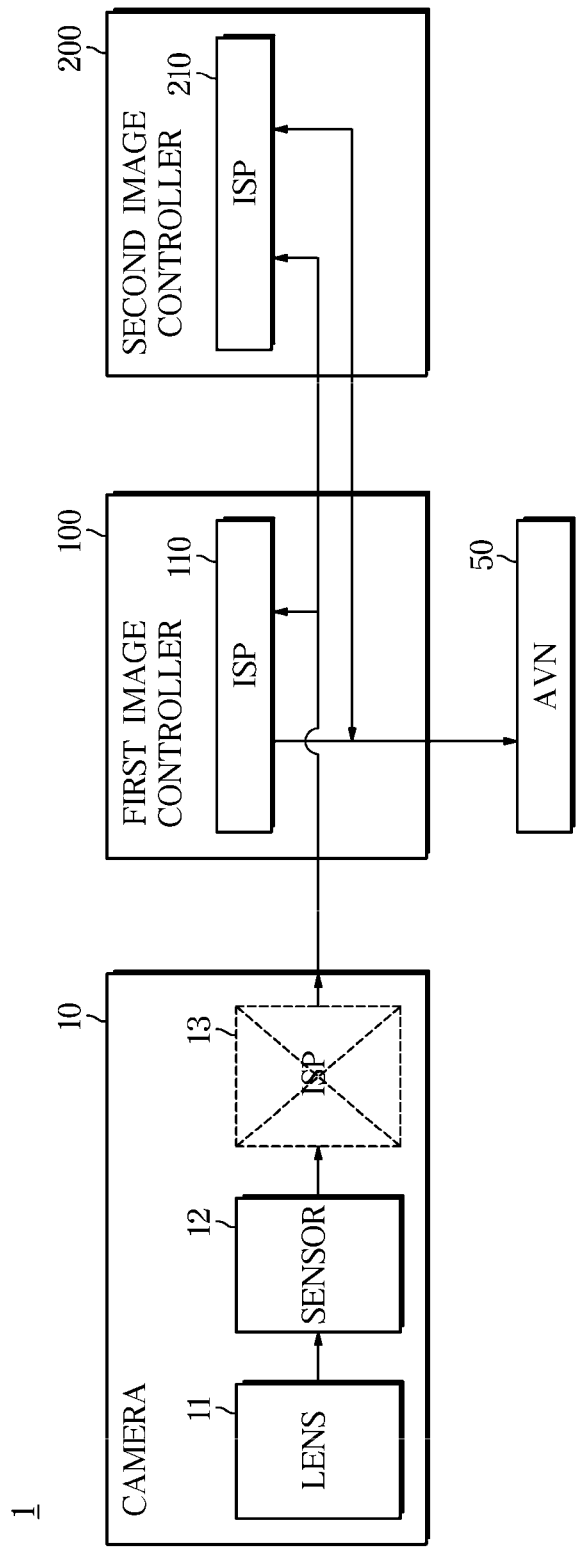
FIG. 1 is a control block diagram illustrating a plurality of controllers and a camera included in a vehicle according to exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Like reference numerals refer to like elements throughout the specification. Not all elements of exemplary embodiments of the present invention will be described, and description of what are commonly known in the art or what overlap each other in the exemplary embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be understood that when an element is referred to as being "connected" to another element, it may be directly or indirectly connected to the other element, wherein the indirect connection includes "connection" via a wireless communication network.

Furthermore, when a part "includes" or "comprises" an element, unless there is a particular description contrary thereto, the part may further include other elements, not excluding the other elements.

Furthermore, when it is stated that a layer is "on" another layer or substrate, the layer may be directly on another layer or substrate or a third layer may be disposed therebetween.

It will be understood that, although the terms first, second, third, etc., may be used herein to describe various elements, it may not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

The principle and exemplary embodiments of the present invention will now be described with reference to the accompanying drawings.

FIG. 1 is a control block diagram illustrating a plurality of controllers and a camera included in a vehicle according to exemplary embodiments of the present invention.

Referring to FIG. 1, a vehicle 1 may include a first image controller 100 including a camera 10 and an image signal processor (ISP) 110, and a second image controller 200 including an ISP 210.

At least one camera 10 may be provided in the vehicle 1, and may include a lens 11 and a sensor 12. The camera 10 does not include an ISP 13, and may transmit image data output form the sensor 12 to the first image controller 100 and/or the second image controller 200 through a network in the vehicle 1. The camera 10 may adjust the lens 11 and the sensor 12 according to tuning parameters determined by the first image controller 100 or the second image controller 200.

The lens 11 may be specified by a focal length, an aperture (a ratio of a diameter of the lens to the focal length), an angle of view (a width of a captured image), and the like. The lens 11 may adjust the focal length, the aperture, the angle of view, and the like according to the tuning parameters transmitted from an image controller designated as a master among the first image controller 100 or the second image controller 200.

The sensor 12 may include a charge coupled device (CCD) sensor or a complementary metal-oxide semiconductor (CMOS) sensor, and may convert light transmitted by the lens 11 into an electrical signal. The sensor 12 may perform noise processing or afterimage processing. The sensor 12 may perform noise processing or afterimage processing according to the tuning parameters transmitted from an image controller designated as the master among the first image controller 100 or the second image controller 200.

Hereinafter, data generated by the camera 10 according to the tuning parameters may be referred to as first image data.

The first image data generated by the camera 10 may be transmitted to the first image controller 100 and/or the second image controller 200 provided in the vehicle 1.

The first image controller 100 may include the ISP 110. The ISP 110 may be a processor that temporarily stores the first image data transmitted by the camera 10 and performs image processing such as Auto White Balance (AWB) and Auto Exposure (AE) or noise removal.

The first image controller 100 may be a digital video recorder system (DVRS) that stores an image captured by the camera 10 and adds a capturing time and date when the image is stored. The DVRS may be directly connected to the camera 10 and may operate to record the image even in a parking mode of the vehicle 1. The DVRS may be connected by a coaxial cable to share the image with the second image controller 200 provided in the vehicle 1.

The first image controller 100 may output the image data through an audio video navigation (AVN) 50.

The AVN 50 may be provided in a center fascia area of the vehicle 1 and may be a control module that outputs the image or sound. In the exemplary embodiment of the present invention, a module for outputting the image is referred to as the AVN 50, but is not necessarily limited thereto. For example, the vehicle 1 may provide the image processed by the first image controller 100 or the second image controller 200 to a user terminal of a driver through a communication module.

The second image controller 200 may also include the ISP 210. The second image controller 200 may transmit the tuning parameters required for the operation to the camera 10. The camera 10 may generate the electrical signal, that is, the first image data, through the tuning parameters transmitted by the second image controller 200, and may transmit the first image data to the second image controller 200.

The second image controller 200 may process the first image data through the ISP 210. The ISP 100 of the first image controller 100 may not transmit the tuning parameters to the camera, but may not process or perform the image processing on the first image date such as noise processing for recording image quality based on the tuning parameters transmitted by the second image controller 200. The first image controller 100 may output the image transmitted by the second image controller 200 through the AVN 50.

According to an exemplary embodiment of the present invention, the second image controller 200 may be a control module in which Surround View Monitoring (SVM) and Advanced Driver Assistance System (ADAS) are integrated. The SVM may synthesize a plurality of first image data captured by the plurality of cameras 10 provided at the front, rear, and side of the vehicle 1, and then may output a surround view generated through the AVN 50. The ADAS may output the image processing or a blind spot image necessary for parking through the image of the camera 10 to assist the driver.

On the other hand, the first image controller 100 and the second image controller 200 may be implemented with a memory storing an algorithm to control operation of the components of the various components including the ISPs 110 and 210, respectively, or data about a program that implements the algorithm, and a processor carrying out the aforementioned operation using the data stored in the memory. The memory and the processor may be implemented in separate chips. Alternatively, the memory and the processor may be implemented in a single chip. Furthermore, the first image controller 100 and the second image controller 200 may be connected through the coaxial cable provided in the vehicle 1.

Furthermore, the first image controller 100 and the second image controller 200 included in the vehicle 1 are not necessarily limited to the above-described control module, and may be variously changed.

Figure 2:
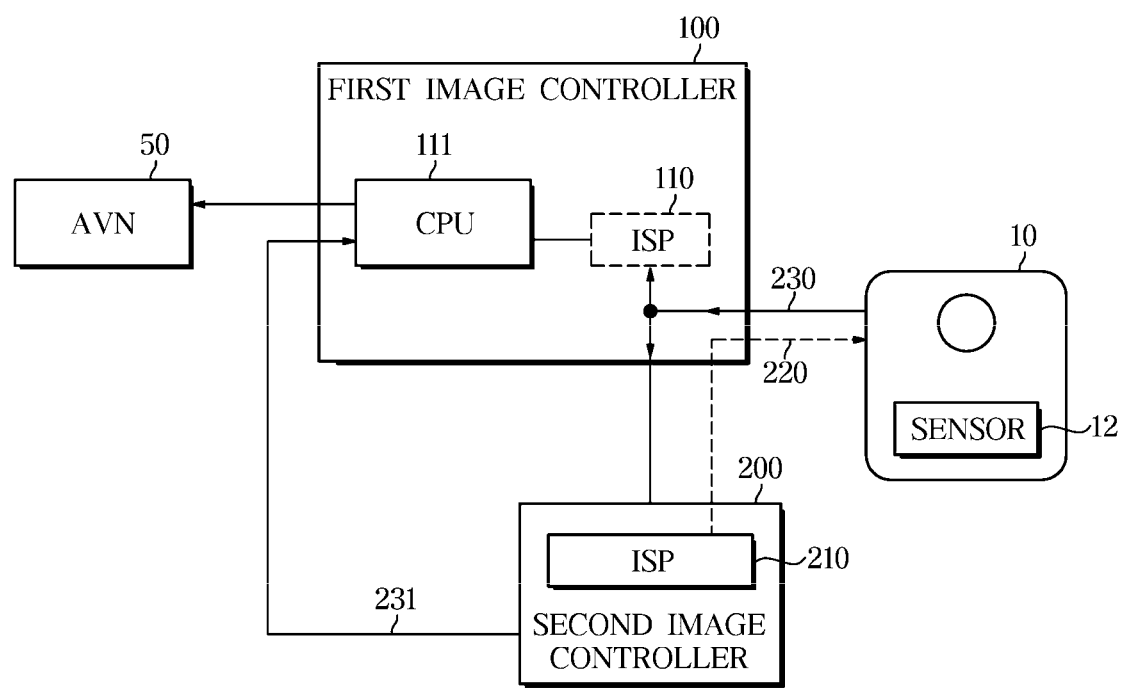
FIG. 2 and FIG. 3 are views for describing an operation of a vehicle according to exemplary embodiments of the present invention.
Figure 3:
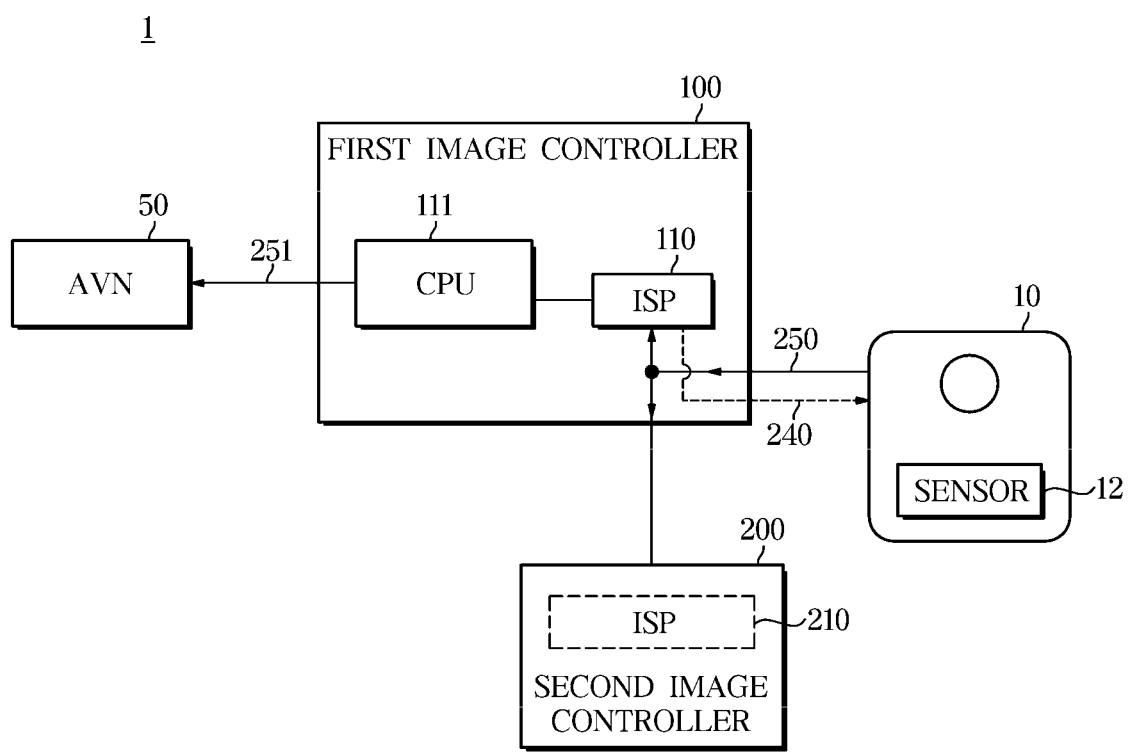

FIG. 2 and FIG. 3 are views for describing an operation of a vehicle according to exemplary embodiments of the present invention. To avoid overlapping description, it demonstrates together below.

The vehicle 1 may determine the image controller to operate based on an operation mode. The operation mode may include various operation modes including a driving mode or a parking mode. In each operation mode, the image controller to operate may be set.

The operation mode of the vehicle 1 may be changed by a user input. The user input may be transmitted using a communication network signal such as a controller area network (CAN), and may be determined the image controller to be operated as the master in the operation mode.

FIG. 2 illustrates a case in which the operation mode is the driving mode. In the driving mode, the second image controller 200 is configured as a master role. When the second image controller 200 performs the master role, the ISP 210 of the second image controller 200 may determine the tuning parameters required for the operation.

The second image controller 200 may transmit the determined tuning parameter to the camera 10 through the communication network in the vehicle 1 (220). The communication network may be an Inter Integrated Circuit (I2C) communication or a Low-Voltage Differential Signaling (LVDS) channel.

The camera 10 may operate the sensor 12 based on the determined tuning parameter and generate the first image data. The generated first image data may be transmitted to the first image controller 100 and the second image controller 200 through the communication network in the vehicle 1 (230). That is, the ISP 110 of the first image controller 100 may receive the first image data generated by the camera 10 based on the tuning parameters transmitted by the second image controller 200.

The ISP 210 of the second image controller 200 may process the image based on the received first image data. As described above with reference to FIG. 1, when the first image controller 100 is directly connected to the AVN 50, the second image controller 200 may transmit the image processed second image data to the AVN 50 through the first image controller 100 (231). The first image controller 100 may include a central processing unit (CPU) 111 and receive the image processed second image data by the ISP 210 of the second image controller 200.

A CPU 111 of the first image controller 100 may transmit the received second image data to the AVN 50, and the AVN 50 may output the second image data.

The second image controller 200 may also include a processor or a memory, such as the CPU 111 of the first image controller 100.

FIG. 3 illustrates a case in which the operation mode is the parking mode. In the parking mode, the first image controller 100 is configured as the master role. When the first image controller 200 performs the master role, the ISP 110 of the first image controller 100 may determine the tuning parameters required for the operation.

The first image controller 100 may transmit the determined tuning parameter to the camera 10 through the communication network in the vehicle 1 (240). The communication network may be the I2C communication or the LVDS channel.

The camera 10 may operate the sensor 12 based on the determined tuning parameter and generate the first image data. The generated first image data may be transmitted to the first image controller 100 through the communication network in the vehicle 1 (250).

The ISP 110 of the first image controller 100 may process the image based on the received first image data. Since the first image controller 100 is connected to the AVN 50, the first image controller 100 may transmit the image processed second image data to the AVN 50 (251). The AVN 50 may reproduce the second image data.

When the first image controller 200 operates as the master in the parking mode, the ISP 210 of the second image controller 200 may operate in a sleep mode. That is, the ISP 210 of the second image controller 200 does not image the first image data.

Meanwhile, the image controller provided as the master role may transmit the tuning parameters determined to the image controller provided as a slave role. That is, when the second image controller 200 transmits the determined tuning parameter to the camera 10 in the exemplary embodiment of FIG. 2, the tuning parameters may also be transmitted to the first image controller 100.

For example, the tuning parameters may be transmitted to the first image controller 100 through at least one of a communication or a serial manner configured for transmitting and receiving between the ISPs. In another example, the camera 10 may allow the first image controller 100 to receive the determined tuning parameter by inserting the determined tuning parameter into the header of the generated first image data.

Figure 4:
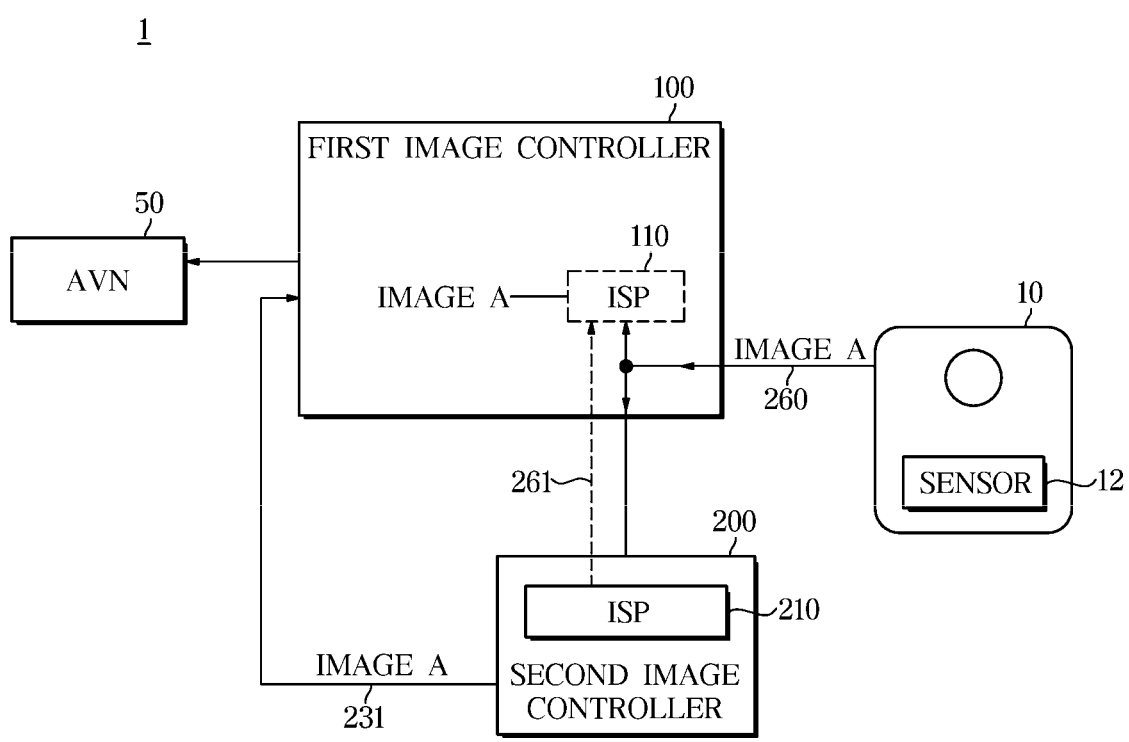
FIG. 4 is a view for describing an operation of a vehicle in an operation mode according to another exemplary embodiment of the present invention.

FIG. 4 is a view for describing an operation of a vehicle in an operation mode according to another exemplary embodiment of the present invention.

Referring to FIG. 4, the operation mode according to an example of the vehicle 1 may be an operation in which the first image controller 100 and the second image controller 200 may perform image processing together. Even in the instant case, the vehicle 1 may operate the image controller of at least one of the first image controller 100 and the second image controller 200 as a master.

For example, when the second image controller 200 operates as the master, the second image controller 200 may transmit the determined tuning parameter to the camera 10. The camera 10 may transmit the first image data, that is, an image A, to the first image controller 100 and the second image controller 200 according to the determined tuning parameter (260).

The second image controller 200, which is the master, may process the received first image data through the ISP 210. Thereafter, the second image controller 200 may determine additional image processing according to the function of the first image controller 100. The second image controller 200 may determine additional parameters required for additional image processing, and may transmit the determined additional parameters to the first image controller 100 in real time (261). The first image controller 100 and the second image controller 200 may perform the image processing of the first image data through the ISPs 110 and 210 based on the determined additional parameter, and may generate the image processed second image data, that is, a corrected image A'.

The corrected image A' may be collectively collected by the first image controller 100 and then output through the AVN 50.

Meanwhile, the vehicle 1 may include a third image controller including the ISP in addition to the first image controller 100 and the second image controller 200. According to another operation mode, the third image controller may operate as the master, and the first image controller 100 and the second image controller 200 may operate as slaves. When the third image controller is configured to determine the tuning parameter, the third image controller may transmit the determined tuning parameter to the camera 10, and the first image controller 100 and the second image controller 200 may receive the first image data according to the determined tuning parameter.

FIG. 5 is a flowchart illustrating a method of controlling a vehicle according to exemplary embodiments of the present invention.

Referring to FIG. 5, the image controller may be configured to determine the tuning parameters based on the operation mode (300).

In the operation mode, the image controller to be operated as the master is set. Therefore, the image controller operating as the master may determine the tuning parameters according to the operation mode and the function of the image controller.

The tuning parameters are necessary for the operation of the camera 10 and may vary according to the functions of the image controller operating as the master.

The image controller may transmit the determined tuning parameters to the camera 10 (310).

The image controller may transmit the determined tuning parameters to the camera 10 through an Inter Integrated Circuit (I2C) communication.

The camera 10 may generate the first image data according to the received tuning parameters (320).

The first image data is an image before the image processing is performed by the ISP.

The camera 10 may transmit the first image data to the first image controller 100 and the second image controller 200 (330).

The camera 10 may insert the determined tuning parameters into the header of the first image data, and the image controller operating as the slave may receive the first image data.

The image processing may be performed based on the received first image data (340).

The first image controller 100 and the second image controller 200 may include the ISP and perform the image processing of the first image data in the image controller operating as the master.

The image controller may transmit the processed second image data (350).

The image controller operating as the master may transmit the processed image to the AVN 50 or the image controller operating as the slave through the coaxial cable. In the exemplary embodiment illustrated in FIG. 2, when the image controller operating as the master is not directly connected to the AVN 50, the image controller operating as the slave may receive the processed image and transmit the processed image to the AVN 50. In the exemplary embodiment shown in FIG. 3, when the image controller operating as the master is directly connected to the AVN 50, the image controller operating as the slave may operate in the sleep mode, and the image controller operating as the master may transmit the processed image to the AVN 50.

The AVN 50 may display the image (360).

The processed image is not necessarily displayed only on the AVN 50, but may be displayed on various displays provided in the vehicle 1.

Through this, the vehicle 1 can transfer the ISP built in the camera 10 to the image controller, reducing a cost and securing a pixel area in the sensor 12 to the maximum. Furthermore, when combining different control modules including various ISPs, it is possible to perform a stable operation.

According to the vehicle and the method of controlling the vehicle according to the exemplary embodiments of the present invention, by providing a manner of arranging sequences between ISPs included in each of the image controllers, it is possible to block transmission of erroneous image data which may be transmitted by the camera due to signal collision, and further prevent degradation of image quality and function of the image controllers.

Meanwhile, the disclosed exemplary embodiments may be implemented in a form of a recording medium storing instructions that are executable by a computer. The instructions may be stored in a form of a program code, and when executed by a processor, the instructions may generate a program module to perform operations of the included exemplary embodiments. The recording medium may be implemented non-transitory as a computer-readable recording medium.

The non-transitory computer-readable recording medium may include all kinds of recording media storing commands which may be interpreted by a computer. For example, the non-transitory computer-readable recording medium may be, for example, ROM, RAM, a magnetic tape, a magnetic disc, flash memory, an optical data storage device, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle comprising:
   a camera configured to generate first image data based on a tuning parameter;
   a first image controller connected to the camera and including a first image signal processor (ISP) configured to perform image processing of the first image data; and
   a second image controller connected to the camera and including a second ISP configured to perform the image processing of the first image data,
   wherein, in response to an operation mode being a parking mode, the first image controller activates the first ISP and the second image controller switches the second ISP to a deactivated mode,
   in response to the operation mode being a driving mode, the second image controller activates the second ISP and the first image controller switches the first ISP to the deactivated mode,
   among the first and second image controllers, an image controller with an ISP activated determines the tuning parameter based on the operation mode, and transmit the determined tuning parameter to the camera, and an image controller in which the ISP is in the deactivated mode receives the first image data on which the image processing has been performed according to the determined tuning parameter from the camera.

2. The vehicle according to claim 1, further including:
   an audio video navigation (AVN) configured to output an image transmitted by the first image controller,
   wherein the first image controller is configured to:
      transmit the first image data to the AVN; and
      transmit second image data obtained by the image processing of the first image data by the second ISP of the second image controller to the AVN.

3. The vehicle according to claim 2, wherein the second image controller is configured to transmit the determined tuning parameter to the first image controller through an inter integrated circuit (I2C) communication or a low-voltage differential signaling (LVDS) channel.

4. The vehicle according to claim 1, wherein the camera is configured to insert the determined tuning parameter into a header of the first image data.

5. The vehicle according to claim 1, wherein the second image controller is configured to:
after receiving the first image data, determine an additional parameter; and
perform the image processing of the first image data based on the determined additional parameter.

6. The vehicle according to claim 5, wherein the second image controller is configured to transmit the additional parameter to the first image controller through at least one of an ISP communication or a serial manner.

7. The vehicle according to claim 6, wherein the first image controller is configured to perform the image processing of the first image data according to the additional parameter.

8. The vehicle according to claim 1, wherein the second image controller is configured to:
generate a surround view based on a plurality of first image data transmitted from a plurality of cameras; and
transmit the generated surround view to the first image controller.

9. The vehicle according to claim 1, further including:
a third image controller including a third ISP configured to receive the first image data and perform the image processing of the first image data,
wherein, when the third image controller determines the tuning parameter based on the operation mode, the third image controller is configured to transmit the determined tuning parameter to the camera, and the first image controller and the second image controller are configured to receive the first image data.

10. A method of controlling a vehicle, the vehicle including a first image controller including a first image signal processor (ISP) and a second image controller including a second ISP, the method comprising:
in response to an operation mode being a parking mode, activating, by the first image controller, the first ISP, and switching, by the second image controller, the second ISP to a deactivated mode,
in response to the operation mode being a driving mode, activating, by the second image controller, the second ISP, and switching, by the first image controller, the first ISP to the deactivated mode,
determining, by an image controller with an ISP activated among the first and second image controllers, a tuning parameter based on the operation mode, and transmitting the determined tuning parameter to a camera, and
receiving, by an image controller in which the ISP is in the deactivated mode, the first image data on which image processing has been performed according to the determined tuning parameter from the camera.

11. The method according to claim 10, further including:
transmitting second image data processed by the second image controller to the first image controller; and
outputting, by the first image controller, the second image data through an audio video navigation (AVN).

12. The method according to claim 11, further including:
transmitting, by the second image controller, the determined tuning parameter to the first image controller through an inter integrated circuit (I2C) communication or a low-voltage differential signaling (LVDS) channel.

13. The method according to claim 11, wherein the transmitting to the first image controller includes:
inserting, by the camera, the determined tuning parameter into a header of the first image data.

14. The method according to claim 10, further including:
after receiving the first image data, determining, by the second image controller, an additional parameter; and
image processing, by the second image controller, the first image data based on the determined additional parameter.

15. The method according to claim 14, further including:
transmitting, by the second image controller, the additional parameter to the first image controller through at least one of an ISP communication or a serial manner.

16. The method according to claim 15, further including:
performing, by the first image controller, the image processing of the first image data according to the additional parameter.

17. The method according to claim 10, further including:
generating, by the second image controller, a surround view based on the first image data transmitted from a plurality of cameras; and
transmitting, by the second image controller, the generated surround view to the first image controller.

18. The method according to claim 10, further including:
when a third image controller determines the tuning parameter based on the operation mode, transmitting, by the third image controller, the determined tuning parameter to the camera;
image processing, by the first controller, the first image data; and
receiving, by the first image controller and the second image controller, the first image data according to the determined tuning parameter.

* * * * *